(12) United States Patent
Fox et al.

(10) Patent No.: US 8,386,336 B1
(45) Date of Patent: Feb. 26, 2013

(54) CUSTOMIZED SOLICITATIONS OF PRODUCT SUGGESTIONS AND PRODUCT RECOMMENDATIONS

(75) Inventors: Eric B. Fox, Seattle, WA (US); Siddharth Sriram, Seattle, WA (US); Syed Waqas Ahmed, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 69 days.

(21) Appl. No.: 13/075,825

(22) Filed: Mar. 30, 2011

(51) Int. Cl.
*G06Q 30/00* (2006.01)
(52) U.S. Cl. .............. 705/26.7; 705/26.1; 705/26.61
(58) Field of Classification Search .................. None
See application file for complete search history.

(56) References Cited

U.S. PATENT DOCUMENTS

| | | | | |
|---|---|---|---|---|
| 7,433,832 B1 * | 10/2008 | Bezos et al. | ................. | 705/26.8 |
| 2004/0235460 A1 * | 11/2004 | Engstrom et al. | .......... | 455/414.1 |
| 2008/0215349 A1 * | 9/2008 | Baran et al. | ...................... | 705/1 |

OTHER PUBLICATIONS www.epinions.com. Jan. 1, 2005. [recovered from www.Archive.org].*

* cited by examiner

*Primary Examiner* — William Allen
(74) *Attorney, Agent, or Firm* — Hope Baldauff Hartman, LLC

(57) ABSTRACT

An online merchant can use a product review to customize a solicitation of a product suggestion. If a customer reviews a product unfavorably, the customer might be solicited to suggest alternate products to the reviewed product. If a customer reviews a product favorably, the customer might be solicited to suggest accessories or other products related to the reviewed product. The products suggested by the customer might then be utilized to recommend the suggested products to other customers. Information provided by a customer in a product review or other data might also be utilized to customize a product recommendation for the customer. If a customer reviews a product unfavorably, a recommendation might be provided to the customer for an alternate, or substitutable, product for the reviewed product. If a customer reviews a product favorably, a recommendation might be provided to the customer for related products or accessories to the reviewed product.

25 Claims, 12 Drawing Sheets

CUSTOMIZED SOLICITATIONS OF PRODUCT SUGGESTIONS AND PRODUCT RECOMMENDATIONS

BACKGROUND

An online merchant may provide a large number of products for sale to customers over the Internet. Customers may access information regarding the available products through a web site or other information service provided by the online merchant. The information regarding the products may include information needed by a customer to identify and purchase a particular product, such as the name of the product, a picture of the product, the price and availability of the product, and a mechanism for initiating a purchase of the product.

In order to enhance the online shopping experience and to allow customers to fully research a particular product, an online merchant might also provide additional product information. The additional product information might include a detailed description of the product, a list of features, technical specifications, as well as reviews of the product provided by other customers. The product reviews allow a potential purchaser to evaluate what other customers think about the product. The reviews may include a quantitative rating for a product, comments regarding another customer's experience and satisfaction with the product, and potentially other information.

In order to collect product reviews, an online merchant might present an appropriate user interface to a customer for submitting the product review. For instance, a user interface through which a customer can provide a product review might be presented to a customer when the customer views a product page, after the customer purchases the product, or at another time. When a customer submits a product review to an online merchant in this manner, the customer provides a valuable indication of their experience with a product and, potentially, with regard to their needs.

It is with respect to these and other considerations that the disclosure made herein is presented.

DETAILED DESCRIPTION

Figure 1:
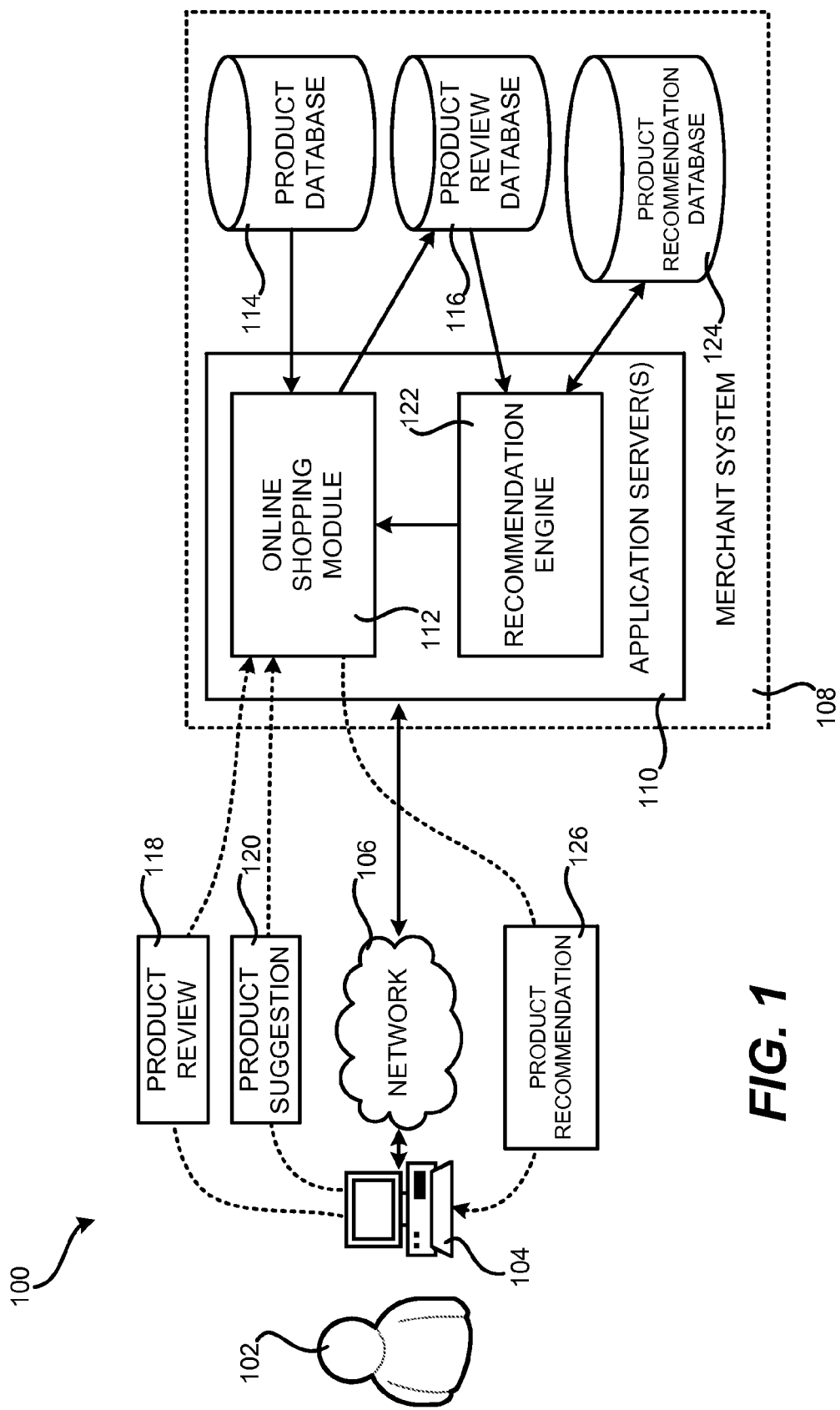
FIG. 1 is a system diagram showing aspects of one illustrative operating environment for implementing the concepts and technologies disclosed herein for providing customized solicitations of product suggestions and for providing customized product recommendations.

The following detailed description is directed to technologies for providing customized solicitations of product suggestions and customized product recommendations. Utilizing the concepts and technologies disclosed herein, an online merchant can utilize information explicitly provided by a customer in a product review to customize a solicitation of a product suggestion from the customer. For instance, if a customer reviews a product unfavorably, the customer might be solicited to suggest products that are alternatives to or substitutable for the reviewed product. As another example, if a customer reviews a product favorably, the customer might be solicited to suggest accessories or other products related to the reviewed product. Data identifying the products suggested by the customer can be stored and later utilized to recommend the suggested products to other customers.

According to other aspects presented herein, information provided by a customer in a product review might also be utilized to customize a product recommendation for the same customer. For instance, if a customer reviews a product unfavorably, a recommendation might be provided to the customer for a product that is an alternative to, or a product that is substitutable for, the reviewed product. If a customer reviews a product favorably, a recommendation might be provided to the customer for related products or accessories for use with the reviewed product. Solicitation of suggested products and recommendation of products to the customer might occur contemporaneously with the user providing the product review or at another time. The products recommended to customers might be products suggested by other customers or might be identified using product sales data, product reviews, or other data.

According to another embodiment disclosed herein, products to be recommended to customers might be identified implicitly through an analysis of product reviews and potentially other data, rather than through the use of an explicit suggestion by a customer. For instance, data identifying purchased products and reviews of the purchased products might be analyzed in order to implicitly identify which products from a set of substitutable products are to be recommended. As an example, a customer might purchase a first product, such as a camera, and review the product unfavorably. If the customer subsequently purchases a second product that is substitutable for the first product, such as another similar camera, and reviews the second product more favorably than the first product, then an inference may be made that the second product is a recommended product.

As another example, reviews of a first product might be compared to reviews of a second, substitutable product, to identify the product that has been more favorably reviewed. Based upon such an analysis, the more favorably reviewed product might be identified as a product to be recommended. In yet another example, a customer purchases a product and returns the product to the online merchant. If the customer subsequently purchases a second product, substitutable for the first product, an inference may be made that the second product is a recommended product. Data identifying the recommended products implicitly identified through the processes described above might be stored for use in recommending the products to customers. It should be appreciated that other types of inferences might also be made to identify recommended products based upon product reviews, customer buying history, and other data.

According to another embodiment disclosed herein, data can be collected explicitly or implicitly regarding accessories purchased for use with a certain product. A recommendation of accessories for use with the product may be made based upon an analysis of reviews of the accessories submitted by customers that own the product. For instance, customers might purchase an accessory for use with a certain product and review the accessory unfavorably. Customers might also purchase a second product accessory for use with the same product and review the second product accessory favorably. In this example, an inference might be made that the second product accessory is a product to be recommended to purchasers of the product.

According to another embodiment, a system is provided for making customized product recommendations. The system includes a merchant system having one or more application servers. An online shopping module is configured to execute on the application servers. The online shopping module provides functionality for receiving a review of a product from a customer. The online shopping module also provides functionality for recommending another product to the customer contemporaneously with receiving the review from the customer.

According to other aspects of the system, the online shopping module is further configured to determine if the product review is favorable or unfavorable. If the review is favorable, the online shopping module is configured to recommend another product that is an accessory to the reviewed product. If the review is unfavorable, the online shopping module recommends another product that is an alternative to or substitutable for the reviewed product. If the review is unfavorable, the online shopping module might also make an offer to the customer to buy back the reviewed product for the customer or might offer an alternate product to the customer at a discount. The product recommendation may be made to the customer contemporaneously with receiving the review from the customer or at another time. The products recommended to customers by the online shopping module might be products suggested by other customers or might be identified using product sales data, product reviews, or other data.

It should be appreciated that the subject matter presented herein may be implemented as a computer process, a computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, electronic book readers, wireless telephone devices, special-purposed hardware devices, network appliances, or the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

FIG. 1 and the following description are intended to provide a brief, general description of a suitable computing environment in which the embodiments described herein may be implemented. In particular, FIG. 1 is a system and network diagram that shows an illustrative operating environment 100 including several software components for providing customized solicitations of product suggestions and customized product recommendations.

The environment 100 includes a customer 102 that uses a customer computer 104 to access a merchant system 108 across a network 106. The customer 102 may be an individual or entity that desires to purchase one or more products from the online merchant that operates the merchant system 108. The customer computer 104 may be a personal computer ("PC"), a desktop workstation, a laptop, a tablet computer, a notebook, a personal digital assistant ("PDA"), an electronic-book reader, a game console, a set-top box, a consumer electronics device, a server computer, or any other computing device capable of connecting to the network 106 and communicating with the merchant system 108.

The network 106 may be a local-area network ("LAN"), a wide-area network ("WAN"), the Internet, or any other networking topology known in the art that connects the customer computer 104 to the merchant system 108. The merchant system 108 may include a number of application servers 110 that provide various online shopping services to the customer computer 104 over the network 106. The customer 102 may use a client application executing on the customer computer 104 to access and utilize the online shopping services provided by the application servers 110.

In one embodiment the client application is a web browser application, such as the MOZILLA® FIREFOX® web browser from MOZILLA FOUNDATION of Mountain View, Calif. The web browser application exchanges data with the application servers 110 in the merchant system 108 using the hypertext transfer protocol ("HTTP") over the network 106. The client application might also be a stand-alone client application configured for communicating with the application servers 110. The client application might also utilize any number of communication methods known in the art to communicate with the merchant system 108 and/or the application servers 110 across the network 106, including remote procedure calls, SOAP-based web services, remote file access, proprietary client-server architectures, and the like.

The application servers 110 may execute a number of modules in order to provide the online shopping services to the customer computer 104. The modules may execute on a single application server 110 or in parallel across multiple application servers in the merchant system 108. In addition, each module may consist of a number of subcomponents executing on different application servers 110 or other computing devices in the merchant system 108. The modules may be implemented as software, hardware, or any combination of the two.

According to one embodiment, an online shopping module 112 executes on the application servers 110. The online shopping module 112 provides functionality for the customer 102 to browse and purchase products available from the online merchant that operates the merchant system 108. For instance, the online shopping module 112 may retrieve information regarding a particular product offered for sale by the online merchant from a product database 114, generate product details containing the product information, and transmit the product details over the network 106 to the client application executing on the client computer 104 for display to the customer 102. Information regarding each product offered for sale might be stored in a product database 114 maintained by the merchant system 108.

The product details transmitted by the application servers 110 to the client computer 104 may be contained in web pages consisting of hypertext markup language ("HTML"), extensible markup language ("XML"), and/or JAVASCRIPT object notation ("JSON") that contains the product information along with instructions regarding how the product details are to be displayed on the customer computer 104, for example. It will be appreciated that any number of methods and technologies may be utilized that allow the online shopping module 112 to encode the product information in the product details and send the product details to the customer computer 104 for display to the customer 102. Other information transmitted from the online shopping module 112 to the client computer 104 may be similarly formatted.

According to embodiments, the online shopping module 112 is also configured to provide functionality for allowing the customer 102 to provide a product review 118. A product review 118 is any indication of an opinion about a product, and may include a quantitative rating of a product, comments regarding the product, information regarding the reviewer, and the like. The online shopping module 112 may store product reviews 118 in a product review database 116 maintained by the merchant system 108. For example, the merchant system 108 might maintain the product review database 116 using an appropriate database technology or other type of data storage system available to the online shopping module 112.

As will be described in greater detail below, the online shopping module 112 might also be configured to solicit a product suggestion 120 from the customer 102. A product suggestion 120 is a suggestion by the customer of a product that the customer would like to recommend to other customers. In one embodiment, the online shopping module 112 is configured to customize the solicitation of a product suggestion 120 from the customer 102. For instance, if the customer provides a favorable product review 118 for a product, the customer might be solicited by the online shopping module 112 to suggest related products or accessories for the reviewed product. If the customer provides an unfavorable product review 118 for a product, the customer might be solicited by the online shopping module 112 to suggest a product that is an alternative to, or substitutable for, the reviewed product. Other types of customized solicitations for a product suggestion 120 might also be provided.

The product suggestion 120 submitted by the customer 102, and product suggestions submitted by other customers, may be stored in an appropriate database maintained by the merchant system 108, such as the product recommendation database 124. The stored product suggestions may then be utilized to recommend products to other customers. Additional details regarding the embodiments presented herein for customized solicitations of product suggestions will be provided below with regard to FIGS. 2-4 and 7.

According to one embodiment, the online shopping module 112 is further configured to provide a customized product recommendation 126 to the customer 102 by way of the computer 104. In this regard, the application servers 110 may be further configured to execute a recommendation engine 122. The recommendation engine 122 is configured to utilize the product reviews 118, product suggestions 120, and potentially other data, to generate a product recommendation 126 that is customized for a customer 102.

In one embodiment, a product review 118 submitted by the customer 102 is analyzed to determine if the review is favorable or unfavorable. If the review is favorable, a product recommendation 126 may be provided to the customer 102 for related products or accessories to the reviewed product. If the review is unfavorable, a product recommendation may be provided to the customer 102 for a product that is an alternative to, or substitutable for, the reviewed product. The recommendation engine 122 and the online shopping module 112 may operate in conjunction to provide this functionality or, alternatively, the functionality provided by the recommendation engine 122 might be incorporated directly into the online shopping module 112. Other implementations might also be utilized. Additional details regarding the embodiments presented herein for customized product recommendations will be provided below with regard to FIGS. 2, 4, 5, and 8.

As will also be described in greater detail below, the online shopping module 112 and the recommendation engine 122 might also be configured to generate product recommendations 126 through an analysis of product reviews 118 and other data, in addition to or rather than through the use of an explicit product suggestion 120 by a customer 102. For instance, data identifying purchased products and product reviews 118 of the purchased products might be analyzed in order to implicitly identify products to be recommended. As one example, the customer 102 might purchase a first product, such as a camera, and provide an unfavorable product review 118. If the customer 102 subsequently purchases a second product that is substitutable for the first product, such as another similar camera, and provides a product review 118 for the second product that is more favorable than the product review 118 for the first product, then the recommendation engine 122 might make an inference that the second product is a recommended product. In response thereto, the recommendation engine 122 might cause a product recommendation 126 to be generated for another customer. It should be appreciated that the product specified in the product recommendation 126 might be identified utilizing recommendations submitted by customers, customer reviews, sales data, or other types of information. Additionally, as will be described below with regard to FIGS. 9, 10A-10C, and 11, other types of inferences might also be made to generate a product recommendation 126.

Figure 2:
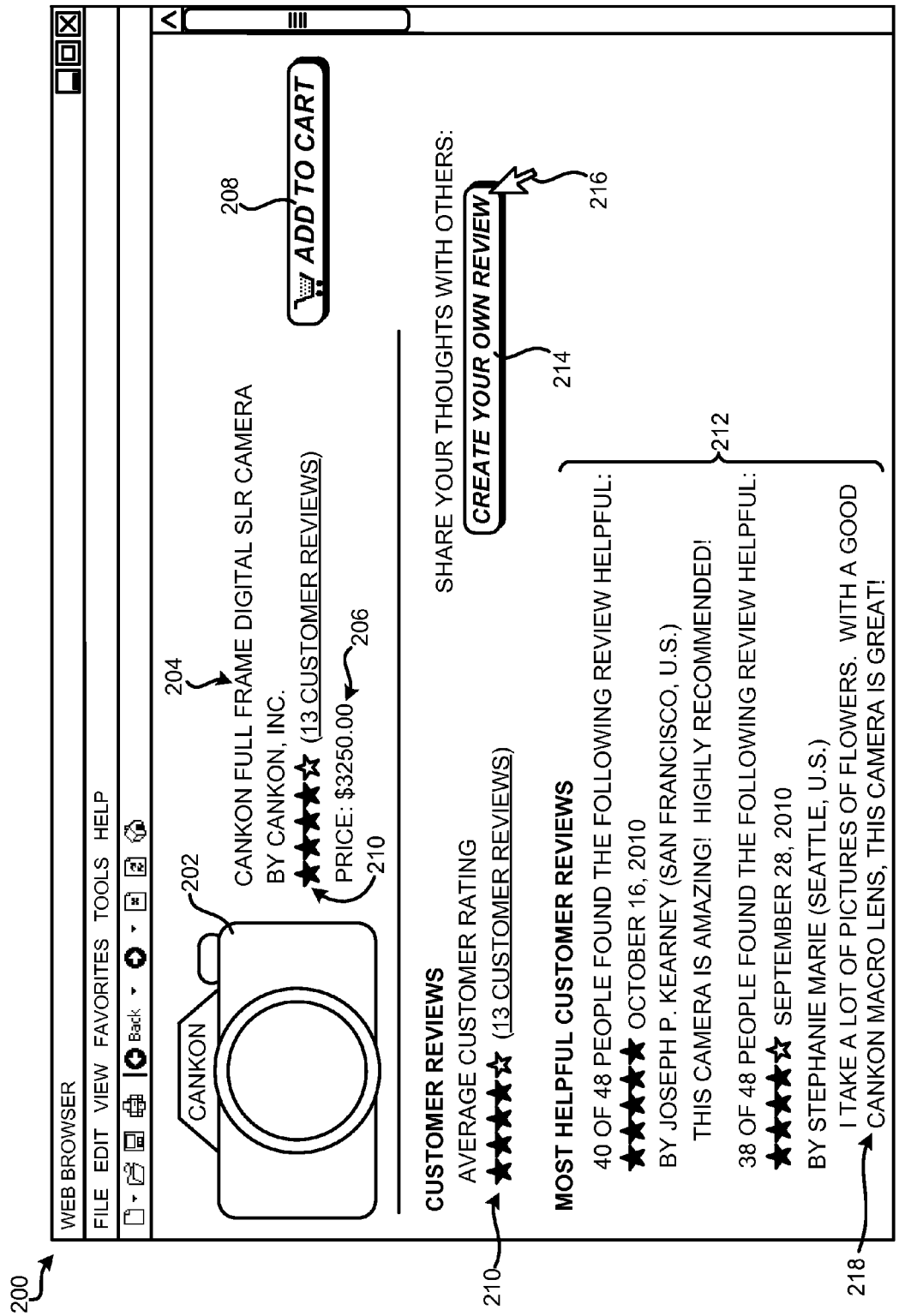
FIG. 2 is a screen diagram showing an illustrative user interface for viewing product reviews and for initiating a product review process, according to embodiments presented herein.

Turning now to FIG. 2, additional details will be provided regarding the functionality provided by the merchant system 108 for allowing a customer to browse, purchase, and review products. In particular, FIG. 2 is a screen diagram showing an illustrative user interface 200 for viewing product reviews and for initiating a product review process provided by the merchant system 108. The user interface 200 is generated by the client application executing on the client computer 104 in response to a customer 102 browsing to a web page for a particular product offered for sale by or on behalf of the online merchant that operates the merchant system 108. In the example shown in FIG. 2, the customer 102 has browsed to a web page for a digital camera. However, virtually any product might be browsed, viewed, and reviewed in the manner disclosed herein.

As shown in FIG. 2, the user interface 200 includes product details for a product including a product image 202, a product identifier 204, and a price for the product 206. Other types of product details might also be provided in other embodiments, such as a detailed description of the product, a list of features, and technical specifications. The user interface 200 also includes a mechanism for initiating a purchase of the product. In this example, a user interface control 208 is provided for adding the product to an e-commerce shopping cart. The shopping cart is utilized to hold items until a user is ready to check out. Other mechanisms for allowing a user to purchase a product might also be utilized, such as a one-click mechanism for allowing a user to purchase the product using only a single action.

The user interface 200 shown in FIG. 2 might also include information indicating how other customers have reviewed the product. For instance, the example user interface 200 shown in FIG. 2 includes an indicator 210 representing an average quantitative rating of the product along with the text 212 of one or more product reviews 118. The text 212 shows the date each product review 118 was made, information regarding the respective reviewer, and all or a portion of the text of the product review 118 provided by the reviewer. An indicator might also be displayed for each product review 118 showing the quantitative rating assigned to the product by each reviewer. Other information might also be displayed.

According to one embodiment, the user interface 200 also can include a product recommendation 126 for another product. If the overall rating of the product is favorable, then the product recommendation 126 might be for an accessory for the product. If the overall rating of the product is unfavorable, the product recommendation 126 might be for an alternate, or substitutable, product. In a similar fashion, a product recommendation 126 might also be shown in conjunction with the text 212 of the product reviews. For instance, in the example shown in FIG. 2, a recommendation 218 made by a reviewer of the product can be included in the text 212 of the product reviews. The recommendation 218 might include a hyperlink to a product page for the recommended products.

The user interface 200 shown in FIG. 2 might also include a mechanism for initiating a process for creating a new review of the product. In the example shown in FIG. 2, a user interface button 214 has been provided which, when selected, such as by placing a mouse cursor 216 on the button 214 and making an appropriate selection with an input device, will cause a process for creating a new review of the product to be started. Illustrative user interfaces for providing a review of the product will be described below with regard to FIGS. 3-6.

It should be appreciated that the user interface shown in FIG. 2, and the user interfaces shown in the other FIGURES, are merely illustrative and that other types of user interfaces can be created to embody the concepts and technologies disclosed herein. In particular, more or less information may be displayed than illustrated and described herein, the information may be displayed in a different format or arrangement, and different user interface controls may be utilized. The illustrative user interfaces presented herein should, therefore, not be considered limiting in any manner.

Figure 3:
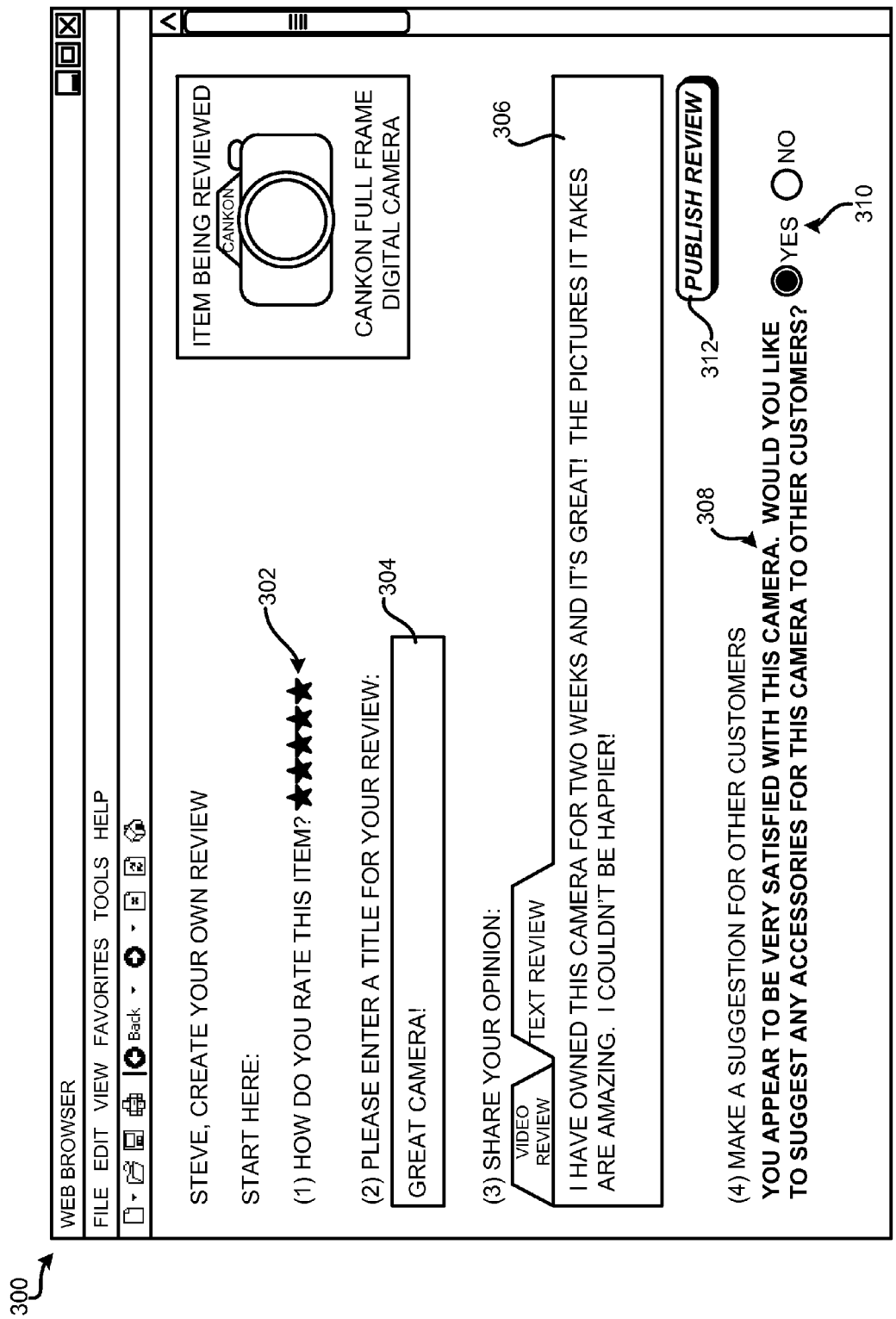
FIGS. 3-4 are screen diagrams showing aspects of several illustrative user interfaces for providing a customized solicitation for product suggestions, according to embodiments presented herein.

FIG. 3 is a screen diagram showing an illustrative user interface 300 for receiving a product review 118 from a customer 102 and for soliciting the customer 102 for a product suggestion 120 in a customized manner. The user interface 300 might be generated by the online shopping module 112 and displayed by the client computer 104 in response to a selection of the user interface button 214 shown in FIG. 2. The user interface 300 might also be generated in response to other types of events.

As shown in FIG. 3, the user interface 300 includes user interface components for allowing a customer 102 to provide a product review 118. In particular, the illustrative user interface 300 shown in FIG. 3 includes a user interface control 302 for allowing the customer 102 to specify a quantitative rating for the product being reviewed. In the example shown in FIG. 3, the customer 102 is permitted to select between one and five "stars" for the product. It should be appreciated that other mechanisms might also be utilized to allow a customer to specify a qualitative rating for a product. It should also be appreciated that although the FIGURES presented herein utilize a rating scale from one to five stars, other types of rating scales might also be utilized. For instance, a customer might be permitted to rate a product from one to ten, from one to one hundred, or in another manner.

The user interface 300 shown in FIG. 3 also includes a text box 304 for allowing the customer 102 to specify a title for the review and a text box 306 for allowing the customer to provide a text review of the product. In other embodiments, an appropriate user interface might be provided for allowing a user to provide an audio or video review of the product.

When the user has completed their product review, the user may select the user interface button 312 in order to publish the review for viewing by other users. The data provided by way of the user interface control 302, the text box 304, and the text box 306 is then saved as a product review 118 in the product review database 116. The product review 118 may then be displayed to other customers viewing the product in the manner described above with regard to FIG. 2.

As described briefly above, the product review submitted by way of the user interface 300 might also be utilized to customize a solicitation of a product suggestion 120 from the customer 102 that provided the review. In this regard, the merchant system 108 provides functionality in one embodiment for determining whether the provided customer review was favorable or unfavorable. This determination may be made based upon the quantitative rating for the product. For instance, a rating of one to three stars might indicate that a review was unfavorable, while a rating of four to five stars indicates a favorable review.

The determination as to whether a review is favorable or unfavorable might also be made based upon the text of the review provided by the customer 102. In this regard, an analysis might be performed on the text to identify words or phrases indicating a favorable or unfavorable sentiment toward the product. For instance, the words "great" and "amazing," and the phrase "I couldn't be happier" might be relied upon to conclude that the review shown in FIG. 3 is favorable. Other words or phrases might be also be relied upon to conclude that a review is unfavorable. Other mechanisms might also be utilized to determine whether a product review 118 is favorable or unfavorable, including explicitly asking a customer whether a review they submitted was favorable or unfavorable. This functionality might be provided by the online shopping module 112 or other components operating within the merchant system 108.

Once the determination has been made as to whether the product review 118 provided by the customer 102 is favorable or unfavorable, this information can be utilized to provide a customized solicitation to the customer 102 for a product suggestion. For instance, if it is determined that the product review 118 provided by the customer was favorable, the customer 102 might be solicited to suggest a product that is related to the reviewed product. As an example, the customer 102 might be solicited to suggest an accessory to the reviewed product.

In the user interface 300 shown in FIG. 3, for instance, text 308 has been presented to the customer 102 indicating, "You appear to be very satisfied with this camera. Would you like to suggest any accessories for this camera to other customers?" A user interface control 310 is also displayed which the customer 102 can use to indicate whether they would like to provide the solicited product suggestion 120. If the user chooses to provide the solicited product suggestion 120, an appropriate user interface (not shown) might be generated and displayed through which the user can identify suggested accessories or other products that are related to the reviewed product.

If it is determined that the product review 118 provided by the customer was unfavorable, the customer 102 might be solicited to suggest another product that is substitutable for the reviewed product. A substitutable product is a product that can be used in place of the reviewed product. For instance, similar digital cameras from the same or different manufacturers may be considered substitutable products. Other types of products might also have substitutable equivalents. The merchant system 108 might maintain data from which the substitutable products can be identified. The merchant system 108 might also maintain data identifying the products, if any, each product is an accessory for.

Figure 4:
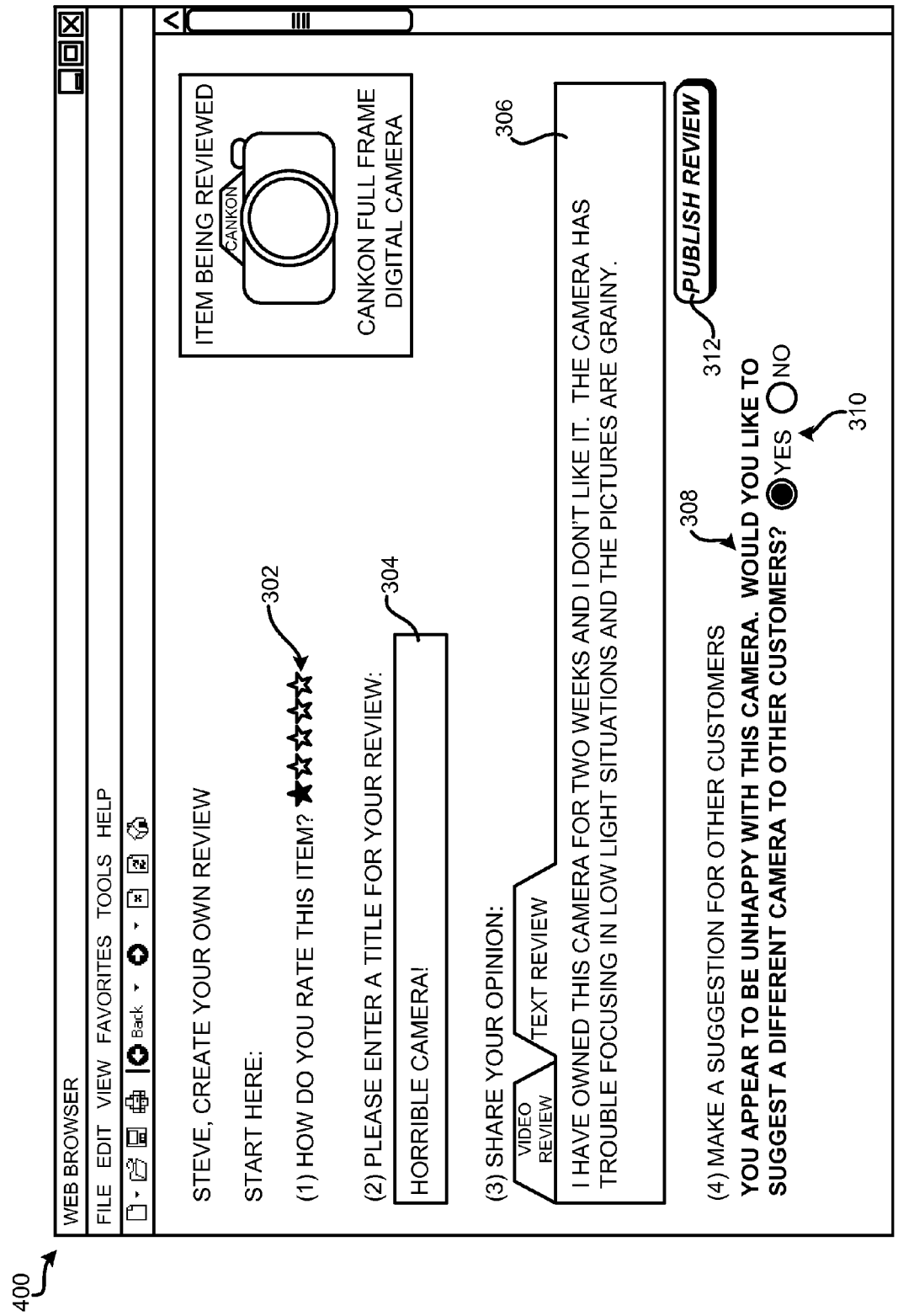

FIG. 4 shows a user interface 400 for receiving a customer review similar to the user interface 300 shown in FIG. 3 and described above. In this example, however, the customer 102 has provided an unfavorable review of the product. This might be determined from the low quantitative rating provided by the customer through the user interface control 302, by an analysis of the text provided by the customer 102, or in another manner.

In response to determining that the customer has provided an unfavorable product review 118 in the example shown in FIG. 4, the customer has been solicited to suggest another product that is substitutable for the reviewed product. In particular, text 308 has been presented to the customer 102 indicating, "You appear to be unhappy with this camera. Would you like to suggest a different camera to other customers?" A user interface control 310 is also displayed which the customer 102 can use to indicate whether they would like to provide the solicited product suggestion 120. If the user chooses to provide the solicited product suggestion 120, an appropriate user interface (not shown) might be generated and displayed through which the user can select a product that is substitutable for the unfavorably reviewed product.

In view of the above, it should be appreciated that a solicitation for a product suggestion 120 can be made to a customer 102 that is customized based upon the sentiment expressed in a product review 118 provided by the customer 102. It should be appreciated that the solicitation of the product suggestion 120 may be made contemporaneously with receiving the product review 118 from the customer 102 as illustrated in FIGS. 3-4. In other embodiments, the solicitation of the product suggestion 120 is made at a time after the product review 118 is received from the customer 102. For instance, an electronic mail ("e-mail") message or another type of message might be later sent to the customer 102 soliciting the customer 102 for the product suggestion 120. The contents of the e-mail message might be customized based upon the sentiment expressed by the customer 102 in the submitted product review 118 in the manner described above.

Figure 5:
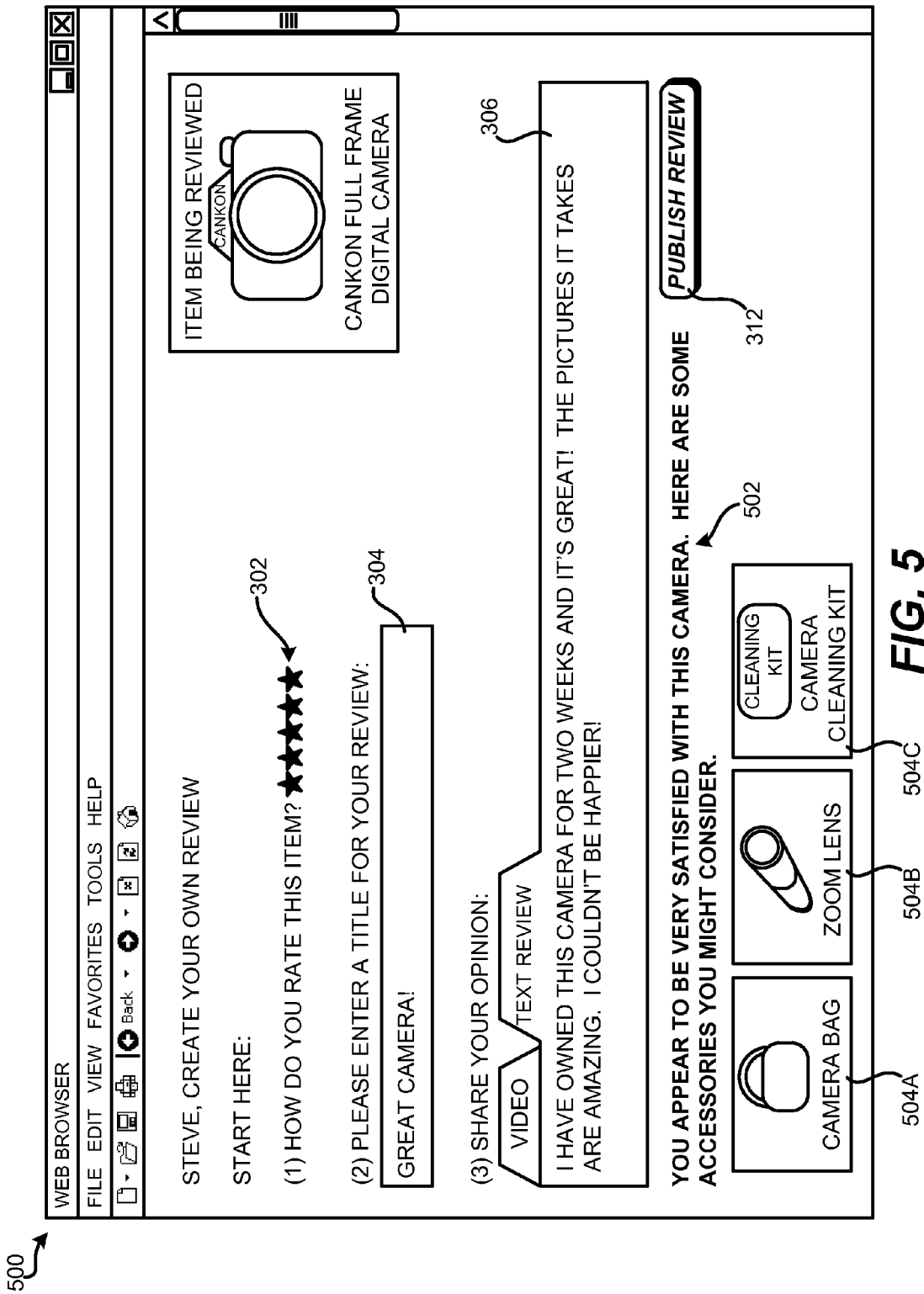
FIGS. 5-6 are screen diagrams showing aspects of several illustrative user interfaces for providing customized product recommendations, according to embodiments presented herein.
Figure 6:
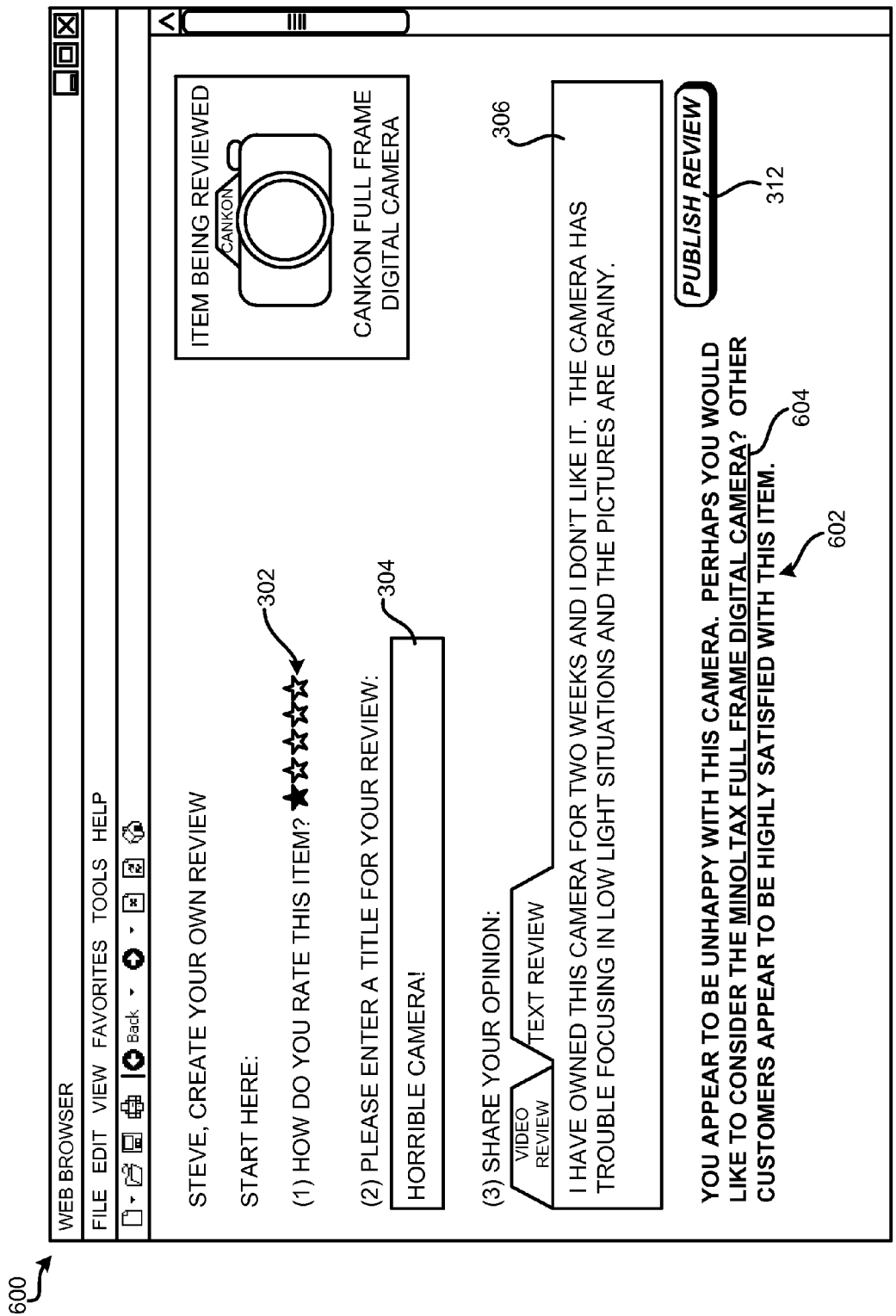

FIGS. 5-6 are screen diagrams showing aspects of several illustrative user interfaces 500 and 600, respectively, for providing a customized product recommendation 126, according to embodiments presented herein. The user interfaces 500 and 600 might be generated by the online shopping module 112 and displayed by the client computer 104 in response to a selection of the user interface button 214 shown in FIG. 2. The user interfaces 500 and 600 might also be generated in response to other types of events.

The user interfaces 500 and 600 include the same user interface components for allowing a customer 102 to provide a product review 118 as described above with regard to FIGS. 3-4. However, instead of soliciting a product suggestion 120 from the customer 102, the user interfaces 500 and 600 are configured to provide a customized product recommendation 126 to the customer 102. As will be described in greater detail below, the product recommendation 126 may be customized based upon whether the customer 102 provides a favorable or an unfavorable product review 118.

In the illustrative user interface 500 shown in FIG. 5, the customer 102 has provided a favorable product review 118. As discussed above, this might be determined based upon the quantitative rating provided by way of the user interface control 302, through an analysis of the text provided in the text boxes 304 and 306, or in another manner. In response to determining that the review is favorable, a product recommendation 126 for one or more products related to the reviewed product, such as accessories for the reviewed product, has been provided to the customer.

In the example shown in FIG. 5, text 502 has been displayed to the user indicating, "You appear to be very satisfied with this camera. Here are some accessories you might consider." Additionally, images 504A-504C for the recommended accessories have been displayed. The images 504A-504C might be selected in order to navigate to the product page for the corresponding product. Additionally, the recommendation set forth in the text 502 and images 504A-504C might be provided on a subsequent page or at a later time. Other types of interfaces might also be provided for identifying recommended products to the customer 102.

In the illustrative user interface 600 shown in FIG. 6, the customer 102 has provided an unfavorable product review 118. In response to determining that the review is unfavorable, a product recommendation 126 for one or more products that are substitutable for the reviewed product has been provided to the customer 102. For example, in the illustrative user interface 600 shown in FIG. 6, the customer 102 has reviewed a digital camera unfavorably and, consequently, another digital camera has been recommended to the customer 102 that has been reviewed favorably by other customers. A hyperlink 604 to a product page for the recommended product has also been displayed. Selection of the hyperlink 604 will cause the product page for the recommended product to be displayed to the customer 102.

In view of the above, it should be appreciated that product recommendation 126 can be made to a customer 102 that is customized based upon the sentiment expressed in a product review 118 provided by the customer 102. It should be appreciated that the recommendation may be made contemporaneously with receiving the product review 118 from the customer 102 as illustrated in FIGS. 5-6. In other embodiments, the recommendation is made at a time after the product review 118 is received from the customer 102. For instance, an e-mail message or another type of message might be later sent to the customer 102 with the product recommendation 126. The contents of the e-mail message might be customized based upon the sentiment expressed by the customer 102 in the submitted product review 118 in the manner described above.

In other embodiments, additional operations might be performed in response to determining that a customer 102 has provided a favorable or an unfavorable product review 118. For instance, in one embodiment, an offer may be made to the customer 102 to buy back a purchased product that has been unfavorably reviewed. In another embodiment, a substitutable product might be offered to the customer 102 at a discount in response to receiving an unfavorable review from the customer 102. Other types of offers and solicitations might also be made in other implementations.

Separate processes have been described above with regard to FIGS. 3-4 and 5-6, respectively, for soliciting a product suggestion 120 from a customer 102 and for providing a product recommendation 126 to the customer 102. It should be appreciated, however, that these processes might be utilized in conjunction with other embodiments. For instance, in response to determining that a customer 102 has provided a favorable product review 118, the customer may be solicited to provide a product suggestion 120 for related products and provided a product recommendation 126 for accessories compatible with the reviewed product. Similarly, in response to determining that the customer 102 has provided an unfavorable product review 118, the customer might be solicited to provide a product suggestion 120 for a substitutable product and provided a product recommendation 126 for a substitutable product. Other types of offers and solicitations might also be provided in other combinations.

Figure 7:
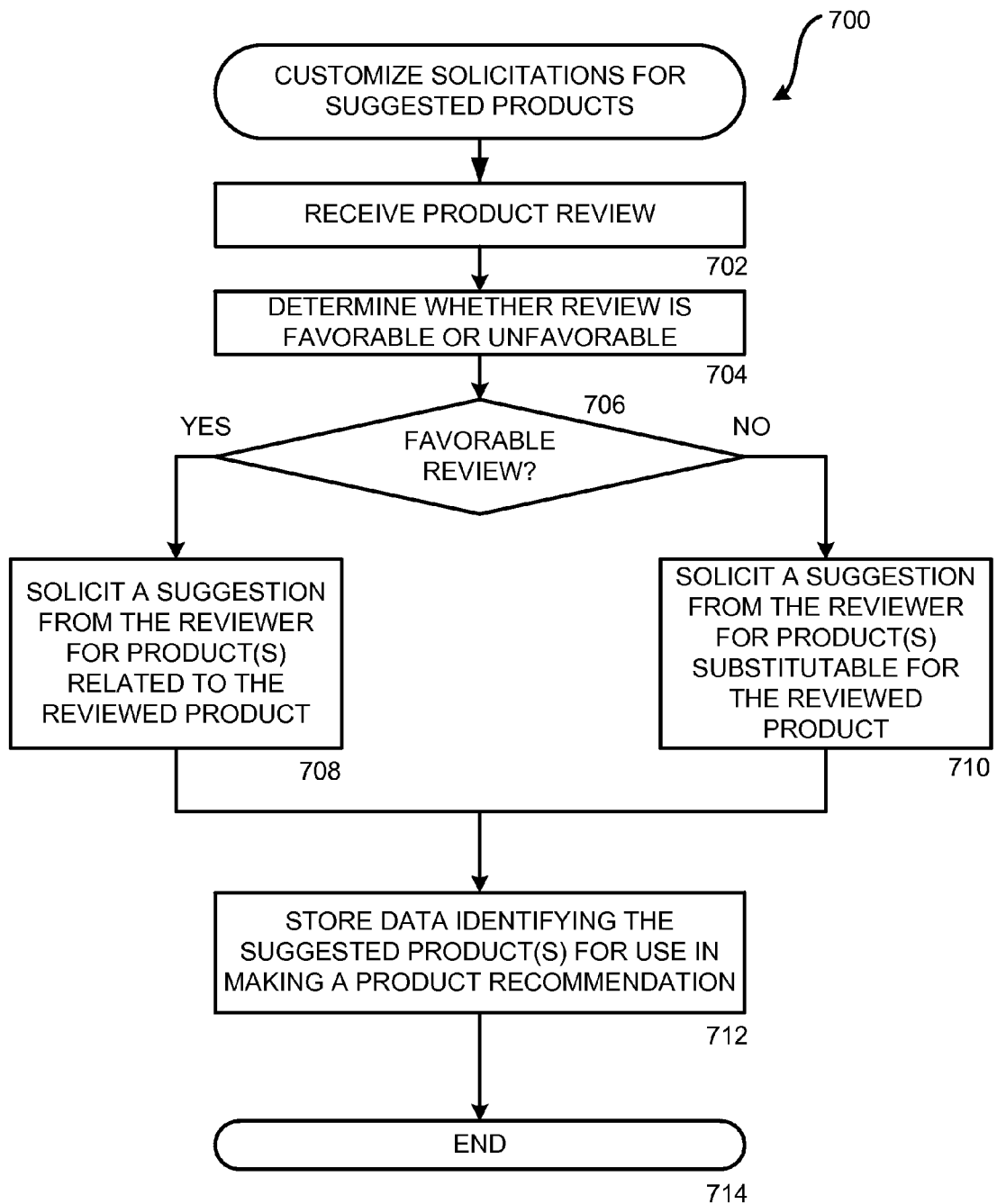
FIG. 7 is a flow diagram showing one illustrative routine for providing a customized solicitation for a product suggestion, according to one embodiment disclosed herein.

Turning now to FIG. 7, additional details will be provided regarding the embodiments described herein for providing customized solicitations for product suggestions 120 and for providing customized product recommendations 126. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein with reference to the various FIGURES are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 7 is a flow diagram showing one illustrative routine 700 for providing a customized solicitation for a product suggestion 120, according to one embodiment disclosed herein. The routine 700 begins at operation 702, where a product review 118 is received from a customer 102. One mechanism for receiving a product review 118 has been described above with regard to FIGS. 2-6. Other mechanisms might also be utilized in other embodiments.

In response to receiving a product review 118 at operation 702, the routine 700 proceeds to operation 704, where a determination is made as to whether the received review is favorable or unfavorable. The various mechanisms described above, and others, might be utilized to make this determination. Once the product review 118 has been identified as favorable or unfavorable, the routine 700 proceeds from operation 706 to operation 708 if the review is favorable and from operation 706 to operation 710 if the review is unfavorable.

At operation 708, the customer 102 is solicited to provide a product suggestion 120 for another product related to the reviewed product, such as an accessory for use with the reviewed product. An illustrative user interface for making such a solicitation was described above with regard to FIG. 3. At operation 710, the customer 102 is solicited to provide a product suggestion 120 for a product that is substitutable for the reviewed product. An illustrative user interface for making such a solicitation was described above with regard to FIG. 4.

From operations 708 and 710, the routine 700 proceeds to operation 712, where data identifying the suggested products is stored for use in making a product recommendation 126 to another customer. This data might be stored in the product recommendation database 124 or in another database accessible to the merchant system 108. From operation 712, the routine 700 proceeds to operation 714, where it ends.

Figure 8:
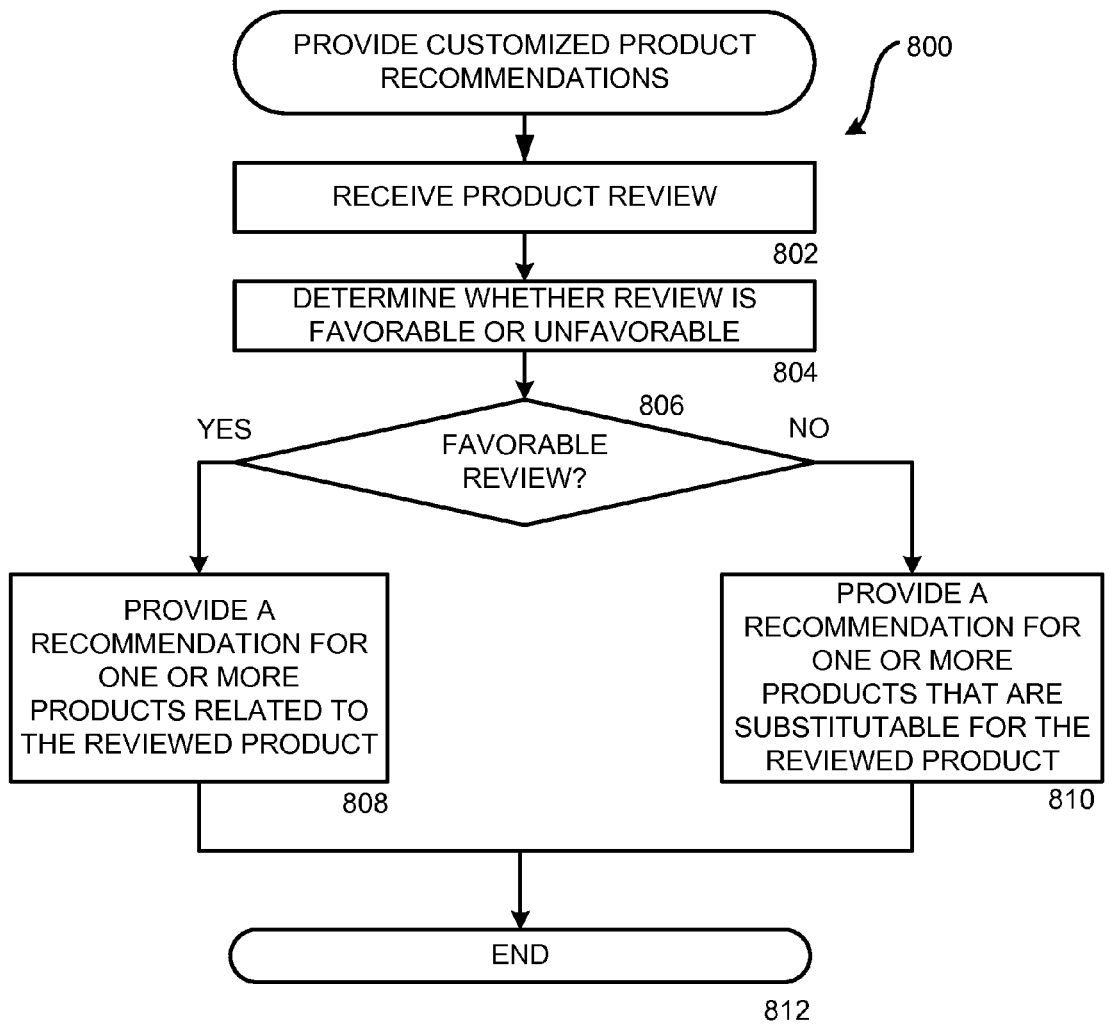
FIG. 8 is a flow diagram showing one illustrative routine for providing customized product recommendations, according to one embodiment presented herein.

FIG. 8 is a flow diagram showing one illustrative routine 800 for providing a customized product recommendation 126, according to one embodiment presented herein. The routine 800 begins at operation 802, where a product review 118 is received from a customer 102. One mechanism for receiving a product review 118 has been described above with regard to FIGS. 2-6. Other mechanisms might also be utilized in other embodiments.

In response to receiving a product review 118 at operation 802, the routine 800 proceeds to operation 804, where a determination is made as to whether the received product review 118 is favorable or unfavorable. The various mechanisms described above, and others, might be utilized to make this determination. Once the received product review 118 has been identified as favorable or unfavorable, the routine 800 proceeds from operation 806 to operation 808 if the review is favorable and from operation 806 to operation 810 if the review is unfavorable.

At operation 808, a product recommendation 126 is provided to the customer 102 for one or more products related to the reviewed product, such as accessories compatible with the reviewed product. An illustrative user interface for providing such a product recommendation 126 was described above with regard to FIG. 5. At operation 810, the customer 102 is solicited provided a product recommendation 126 for a product that is substitutable for the reviewed product. An illustrative user interface for providing such a recommendation was described above with regard to FIG. 6. From operations 808 and 810, the routine 800 proceeds to operation 812, where it ends.

In the embodiments described above with regard to FIGS. 3, 4, and 7, a customer 102 is asked to explicitly provide a product suggestion 120. The explicitly provided suggestion can then be utilized to provide a product recommendation 126 to another customer. As described briefly above, however, products to be recommended to a customer might also be identified implicitly rather than explicitly through the use of an explicit suggestion by a customer. For instance, data identifying purchased products and product reviews 118 for the purchased products might be analyzed in order to implicitly identify products to be recommended. FIGS. 9 and 10A-10C illustrate various processes for identifying recommended products by inference. The products identified through the mechanisms described with regard to FIGS. 9 and 10A-10C might be surfaced to customers through a product recommendation 126 provided in the manner described above or in another manner.

Figure 9:
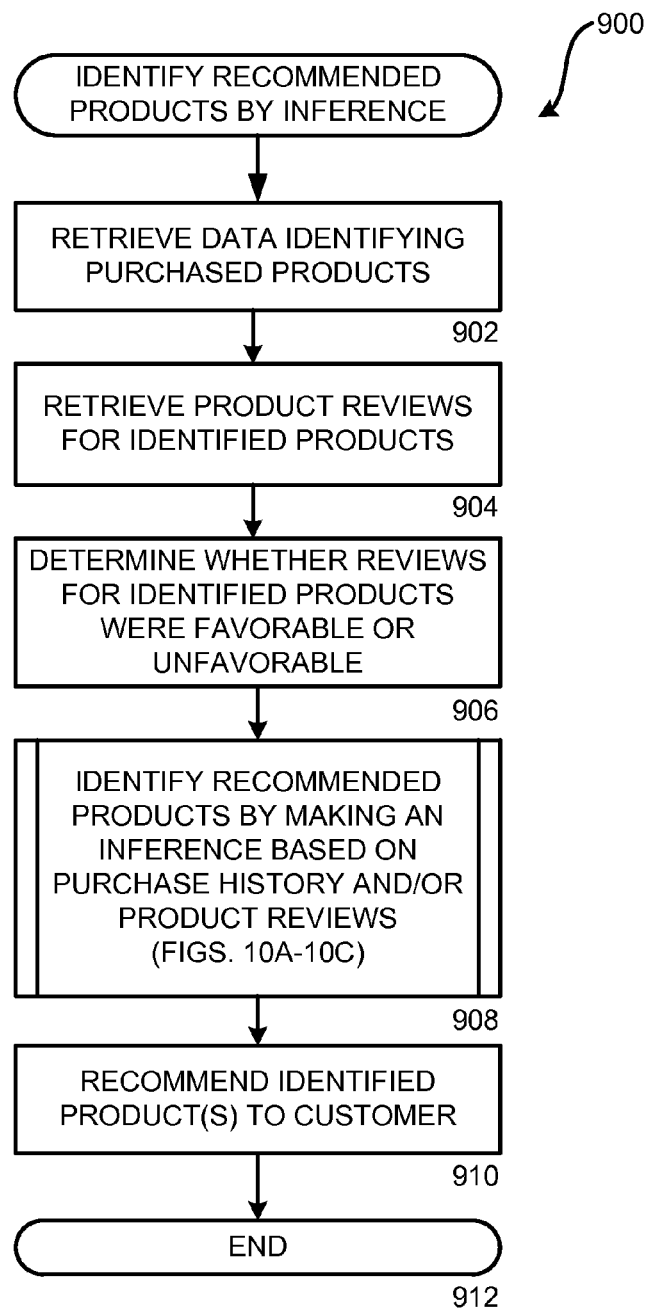
FIG. 9 is a flow diagram showing one illustrative routine for identifying recommended products by inference, according to one embodiment disclosed herein.

FIG. 9 is a flow diagram showing one illustrative routine 900 for identifying recommended products by inference, according to one embodiment disclosed herein. The routine 900 begins at operation 902, where the recommendation engine 122 retrieves data identifying products purchased by customers of the merchant system 108. In this regard, the online shopping module 112 might maintain data identifying the purchase history of customers individually, as a group, or both. As will be described in greater detail below, the recommendation engine 122 might utilize aspects of this data in making a product recommendation to a customer 126.

From operation 902, the routine 900 proceeds to operation 904, where the recommendation engine 122 retrieves product reviews 118 for the products identified at operation 902. Once the appropriate product reviews 118 have been retrieved, the routine 900 proceeds from operation 904 to operation 906, where a determination is made as to whether each product review 118 is favorable or unfavorable. One or more of the mechanisms described above may be utilized to make this determination.

From operation 906, the routine 900 proceeds to operation 908. At operation 908, one or more inferences are made to identify one or more recommended products. The inference, or inferences, may be made based upon the purchase history identified at operation 902, the analysis performed on the product reviews at operation 906, and potentially other information. Several different types of inferences that might be made based upon this data to identify a recommended product are described below with regard to FIGS. 10A-10C.

From operation 908, the routine 900 proceeds to operation 910, where the products identified at operation 908 are recommended to a customer 102 in the form of a product recommendation 126. The product recommendation 126 might be provided to the customer 102 in the manner described above with regard to FIGS. 5 and 6, or in another manner. The routine 900 then proceeds to operation 912, where it ends.

Figure 10:
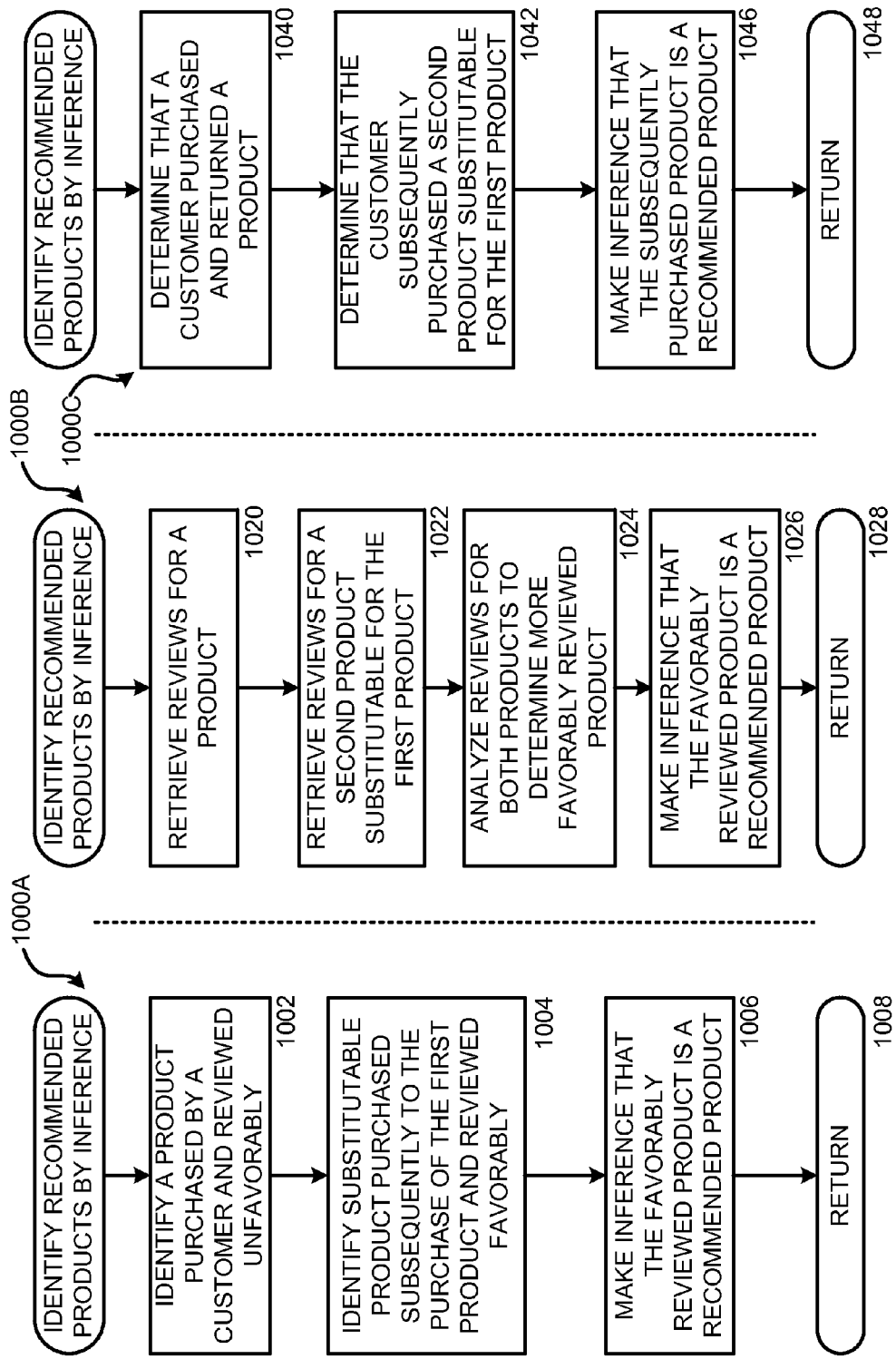
FIGS. 10A-10C are flow diagrams showing several illustrative routines for identifying recommended products based upon an inference, according to embodiments disclosed herein.

FIGS. 10A-10C are flow diagrams showing several illustrative routines 1000A-1000C, respectively, for identifying one or more recommended products based upon one or more inferences, according to embodiments disclosed herein. It should be appreciated that inferences based upon product reviews and customer purchasing history other than those described herein with regard to FIGS. 10A-10C might also be utilized to identify recommended products.

The inference illustrated in the routine 1000A shown in FIG. 10A is utilized in a scenario where a customer purchases a first product and reviews the product unfavorably, but later purchases a second product that is substitutable for the first product and rates the second product favorably. In this scenario, an inference may be reasonably made that the second product is a recommended product.

In order to make the inference described above, the routine 1000A begins at operation 1002, where the recommendation engine 122 identifies a product purchased by a customer 102 and reviewed unfavorably. The routine 1000A then proceeds from operation 1002 to operation 1004, where the recommendation engine 122 identifies a another product purchased by the same customer 102 that is substitutable for the first product and that the customer reviewed favorably. In response to identifying such a product, the routine 1000A proceeds to operation 1006 where the recommendation engine 122 makes an inference that the favorably reviewed product is a recommended product. As discussed above, such an inference might be utilized to provide a product recommendation 126 for the identified product to a customer 102 of the merchant system 108. From operation 1008, the routine 1000A returns to operation 912 of the routine 900, which was described above.

The inference illustrated in the routine 1000B shown in FIG. 10B is made by comparing reviews of one product to reviews of another, substitutable product, to identify the product that has been more favorably reviewed. Based upon such an analysis, the recommendation engine 122 might identify the more favorably reviewed product as a product to be recommended. Accordingly, the routine 1000B begins at operation 1020 where product reviews 118 for a first product are retrieved from the product review database 116. The routine 1000B then continues to operation 1022, where the recommendation engine 122 retrieves reviews for a second product, substitutable for the first product, from the product review database 116.

From operation 1022, the routine 1000B proceeds to operation 1024 where the reviews for both products are analyzed to determine which product has been more favorably reviewed. The mechanisms described above, and others, might be utilized to determine whether each review is favorable or unfavorable. Once a determination is made as to which product has been more favorably reviewed, the routine 1000B proceeds to operation 1026 where the recommendation engine 122 makes an inference that the more favorably reviewed product is a recommended product. This inference might be utilized to provide a product recommendation 126 for the identified product to a customer 102 of the merchant system 108. From operation 1028, the routine 1000B returns to operation 912 of the routine 900, which was described above.

The inference illustrated in the routine 1000C shown in FIG. 10C is utilized in a scenario where a customer 102 purchases a product and returns the product to the online merchant. If the customer 102 subsequently purchases a second product, substitutable for the first product, an inference may be made that the second product is a recommended product. Accordingly, the routine 1000C begins at operation 1040, where the recommendation engine 122 identifies a product that has been purchased by a customer 102 and returned to the online merchant.

From operation 1040, the routine 1000C proceeds to operation 1042, where the recommendation engine 122 determines that the same customer subsequently purchased a second product that is substitutable for the first produce. In response to such a determination, the routine 1000C proceeds from operation 1042 to operation 1046, where the recommendation engine 122 makes an inference that the second product is a recommended product. From operation 1046, the routine 1000C returns to operation 912 of the routine 900, which was described above.

Data identifying the recommended products implicitly identified through the processes described above with regard to FIGS. 10A-10C might be stored for use in recommending the products to customers. For instance, data identifying the products identified by the routines illustrated in FIGS. 10A-10C might be stored in the product recommendation database 124. A recommendation might also be provided to the customer contemporaneously with providing a product review 118 or at another time.

Figure 11:
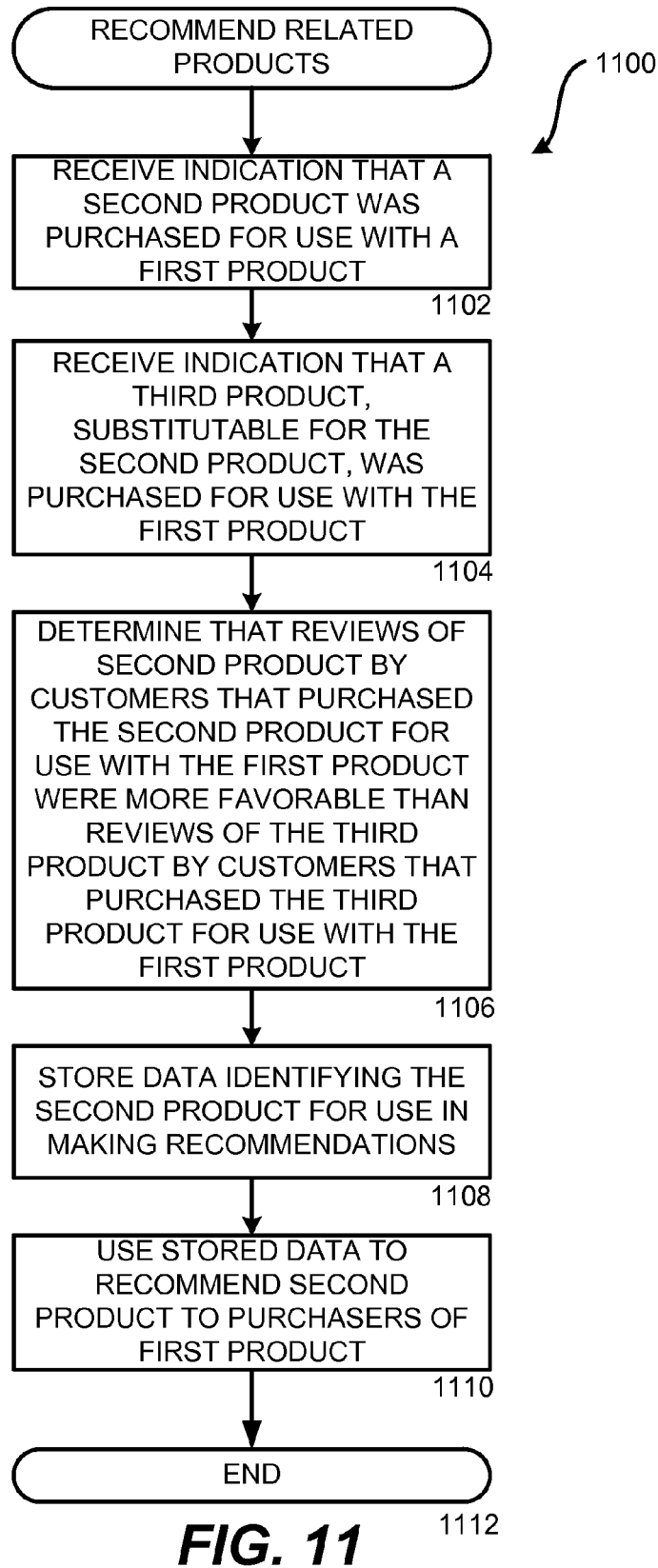
FIG. 11 is a flow diagram showing another illustrative routine for providing customized product recommendations, according to one embodiment disclosed herein.

According to another embodiment disclosed herein, data can be collected explicitly or implicitly regarding related products or accessories purchased for use with a certain product. A recommendation of accessories for use with the product may be made based upon an analysis of reviews of the accessories submitted by customers that own the product. For instance, customers might purchase an accessory for use with a certain product and review the accessory unfavorably. The same or other customers might also purchase a second product accessory for use with the same product and review the second product accessory favorably. In this example, an inference might be made that the second product accessory is a product to be recommended to purchasers of the product. FIG. 11 illustrates this process according to one embodiment disclosed herein.

FIG. 11 is a flow diagram showing another illustrative routine 1100 for providing customized product recommendations, according to one embodiment disclosed herein. The routine 1100 begins at operation 1102, where the recommendation engine 122 receives an indication that a second product was purchased for use with a first product. For instance, an appropriate user interface might be provided through which a user can indicate that a product was purchased for use with another product. As an example, a user interface might be provided through which the customer can specify which brand and model of camera that a memory card was purchased for use with. Alternately, the association between two products might be made by inference. For instance, if a customer purchased a compatible memory card at the same time the customer purchased a camera, an inference might be made that the memory card was purchased for use with the purchased camera.

From operation 1102, the routine 1100 proceeds to operation 1104, where the recommendation engine 122 receives an indication that a third product, substitutable for the second product, was also purchased for use with the first product. For instance, continuing the example given above, the recommendation engine 122 might receive an explicit or implicit indication that another customer purchased a different memory card for use with the same model of camera. From operation 1104, the routine 1100 proceeds to operation 1106.

At operation 1106, the recommendation engine 122 analyzes product reviews 118 of the second and third products by customers that purchased the items for use with the first product to determine which of the second and third products have been more favorably reviewed. In the example given above, the recommendation engine 122 analyzes reviews of the two different memory cards purchased for use with the same digital camera to determine which of the memory cards has been more highly reviewed. Once this has been completed, the routine 1100 continues to operation 1108, where the recommendation engine 122 stores data identifying the more favorably reviewed product for use in making product recommendations 126. As discussed above, such data might be stored in the product recommendation database 124.

From operation 1108, the routine 1100 proceeds to operation 1110 where the recommendation engine 122 uses the data stored at operation 1108 to make a product recommendation 126 to a customer of the merchant system 108. The product recommendation 126 might be made contemporaneously with the customer 102 providing a product review 118 or at another time. From operation 1110, the routine 1100 proceeds to operation 1112, where it ends.

In another embodiment related to the routine 1100, a customer may be asked to explicitly rate products for use with another product. For example, if a customer has recently purchased a specific DSLR camera, and the merchant system determines that the customer is now reviewing a compatible lens, the merchant system might explicitly ask the customer to rate the lens for use with the purchased camera. The merchant system might capture this information in a structured data set configured to store a quantitative (e.g. 1-5 star) rating for a specific pairing of products.

Figure 12:
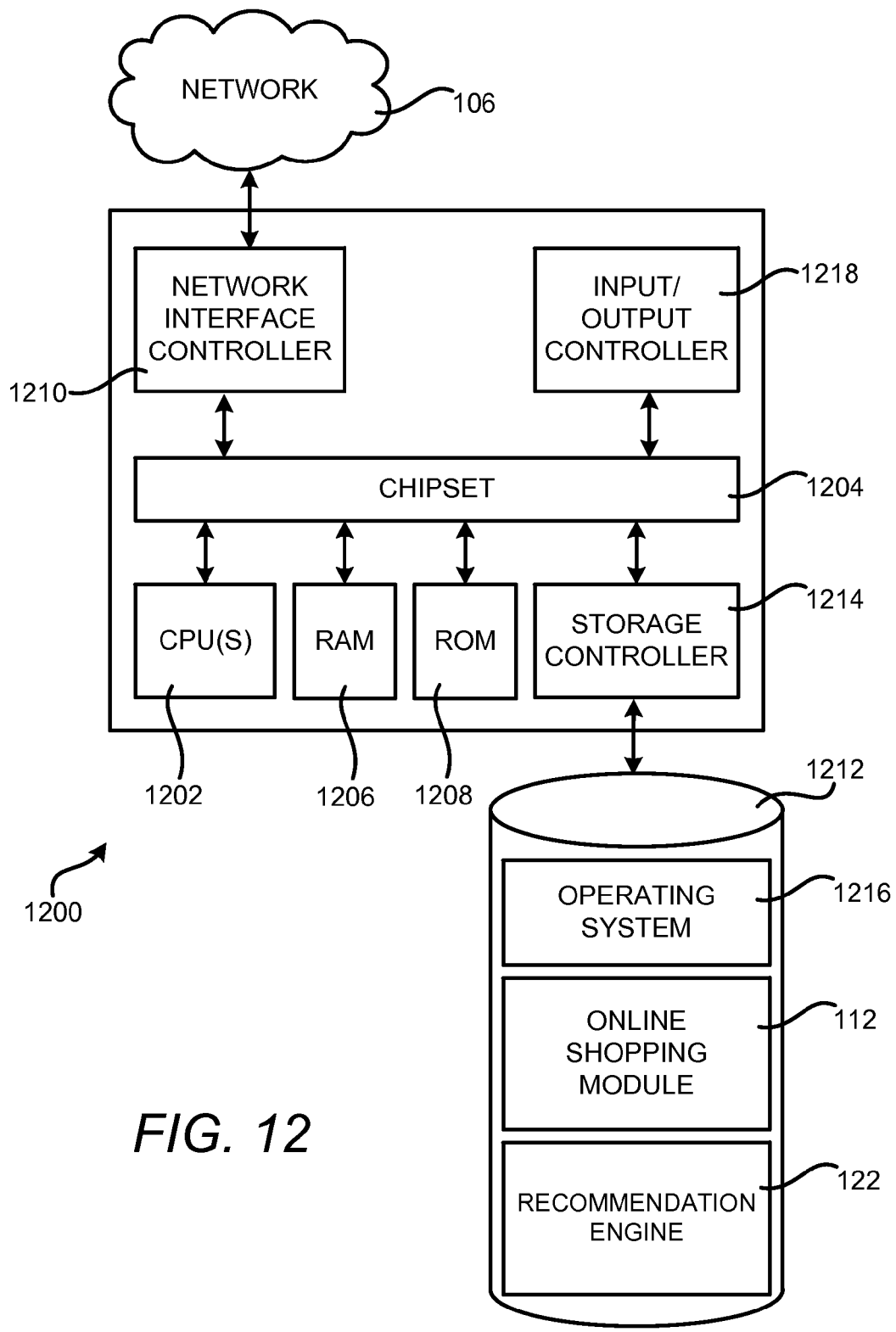
FIG. 12 is a computer architecture diagram showing one illustrative computer hardware architecture for use in computing devices configured to implement the concepts and technologies disclosed herein in one embodiment.

FIG. 12 shows an example computer architecture for a computer 1200 capable of executing the software components described herein for providing customized solicitations of product suggestions and customized product recommendations in the manner presented above. The computer architecture 1200 shown in FIG. 12 illustrates a conventional server computer, workstation, desktop computer, laptop, PDA, electronic book reader, digital wireless phone, network appliance, set-top box, or other computing device, and may be utilized to execute any aspects of the software components presented herein described as executing on the application servers 110, the customer computer 104, or other computing platform.

The computer 1200 includes a baseboard, or "motherboard," which is a printed circuit board to which a multitude of components or devices may be connected by way of a system bus or other electrical communication paths. In one illustrative embodiment, one or more central processing units ("CPUs") 1202 operate in conjunction with a chipset 1204. The CPUs 1202 are standard programmable processors that perform arithmetic and logical operations necessary for the operation of the computer 1200.

The CPUs 1202 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 1204 provides an interface between the CPUs 1202 and the remainder of the components and devices on the baseboard. The chipset 1204 may provide an interface to a random access memory ("RAM") 1206, used as the main memory in the computer 1200. The chipset 1204 may further provide an interface to a computer-readable storage medium such as a read-only memory ("ROM") 1208 or non-volatile RAM ("NVRAM") for storing basic routines that help to startup the computer 1200 and to transfer information between the various components and devices. The ROM 1208 or NVRAM may also store other software components necessary for the operation of the computer 1200 in accordance with the embodiments described herein.

According to various embodiments, the computer 1200 may operate in a networked environment using logical connections to remote computing devices and computer systems through a network, such as a local-area network ("LAN"), a wide-area network ("WAN"), the Internet, or any other networking topology known in the art that connects the computer 1200 to remote computers. The chipset 1204 includes functionality for providing network connectivity through a network interface controller ("NIC") 1210, such as a gigabit Ethernet adapter. For example, the NIC 1210 may be capable of connecting the computer 1200 to other computing devices, such as the application servers 110, the customer computer 104, a data storage system in the merchant system 108, and the like, over the network 106 described above in regard to FIG. 1. It should be appreciated that multiple NICs 1210 may be present in the computer 1200, connecting the computer to other types of networks and remote computer systems.

The computer 1200 may be connected to a mass storage device 1212 that provides non-volatile storage for the computer. The mass storage device 1212 may store system programs, application programs, other program modules, and data, which have been described in greater detail herein. The mass storage device 1212 may be connected to the computer 1200 through a storage controller 1214 connected to the chipset 1204. The mass storage device 1212 may consist of one or more physical storage units. The storage controller 1214 may interface with the physical storage units through a serial attached SCSI ("SAS") interface, a serial advanced technology attachment ("SATA") interface, a FIBRE CHANNEL ("FC") interface, or other standard interface for physically connecting and transferring data between computers and physical storage devices.

The computer 1200 may store data on the mass storage device 1212 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1212 is characterized as primary or secondary storage, or the like. For example, the computer 1200 may store information to the mass storage device 1212 by issuing instructions through the storage controller 1214 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1200 may further read information from the mass storage device 1212 by detecting the physical states or characteristics of one or more particular locations within the physical storage units.

In addition to the mass storage device 1212 described above, the computer 1200 might have access to other computer-readable media to store and retrieve information, such as program modules, data structures, or other data. It should be appreciated by those skilled in the art that computer-readable media can be any available media that may be accessed by the computer 1200, including computer-readable storage media and communications media. Communications media includes transitory signals. Computer-readable storage media includes volatile and non-volatile, removable and non-removable storage media implemented in any method or technology. For example, computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information. Computer-readable storage media does not include transitory signals.

The mass storage device 1212 may store an operating system 1216 utilized to control the operation of the computer 1200. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized.

The mass storage device 1212 may store other system or application programs and data utilized by the computer 1200, such as the online shopping module 112 and/or the recommendation engine 122, both of which were described above.

In one embodiment, the mass storage device 1212 or other computer-readable storage media may be encoded with computer-executable instructions that, when loaded into the computer 1200, transform the computer from a general-purpose computing system into a special-purpose computer capable of implementing the embodiments described herein. These computer-executable instructions transform the computer 1200 by specifying how the CPUs 1202 transition between states, as described above. According to one embodiment, the computer 1200 has access to computer-readable storage media storing computer-executable instructions that, when executed by the computer, perform the various routines and operations described herein.

The computer 1200 may also include an input/output controller 1218 for receiving and processing input from a number of input devices, such as a keyboard, a mouse, a touchpad, a touch screen, an electronic stylus, or other type of input device. Similarly, the input/output controller 1218 may provide output to a display device, such as a computer monitor, a flat-panel display, a digital projector, a printer, a plotter, or other type of output device. It will be appreciated that the computer 1200 may not include all of the components shown in FIG. 12, may include other components that are not explicitly shown in FIG. 12, or may utilize an architecture completely different than that shown in FIG. 12.

Based on the foregoing, it should be appreciated that technologies for providing customized solicitations of product suggestions and customized product recommendations have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method of providing a product recommendation, the method comprising executing instructions in a computer system to perform the operations of:
    receiving a review of a first product from a customer;
    determining, by a processor, whether the review of the first product was favorable or unfavorable;
    in response to determining that the review of the first product was favorable, soliciting a suggestion from the customer of a second product related to the first product;
    in response to determining that the review of the first product was unfavorable, soliciting a suggestion from the customer of a third product substitutable for the first product; and
    storing data identifying the second product or the third product for use in recommending the second product or the third product to another customer.

2. The computer-implemented method of claim 1, wherein the second product is an accessory to the first product.

3. The computer-implemented method of claim 1, wherein soliciting a suggestion from the customer of a second product related to the first product and soliciting a suggestion from the customer of a third product substitutable for the first product occur contemporaneously with receiving the review of the first product from the customer.

4. The computer-implemented method of claim 1, wherein soliciting a suggestion from the customer of a second product related to the first product and soliciting a suggestion from the customer of a third product substitutable for the first product occur after the review of the first product is received from the customer.

5. The computer-implemented method of claim 1, further comprising providing a recommendation to the customer of a product related to the first product in response to determining that the review of the first product was favorable.

6. The computer-implemented method of claim 5, wherein the product related to the first product is an accessory product for the first product.

7. The computer-implemented method of claim 6, wherein the recommendation is provided contemporaneously with receiving the review of the first product from the customer.

8. The computer-implemented method of claim 1 further comprising providing a recommendation to the customer of a product that is substitutable for the first product in response to determining that the review of the first product was unfavorable.

9. The computer-implemented method of claim 8, wherein the recommendation is provided contemporaneously with receiving the review of the first product from the customer.

10. A computer-readable storage medium having computer-executable instructions stored thereupon which, when executed by a computer, cause the computer to:
receive a review of a first product from a customer;
determine whether the review of the first product was favorable or unfavorable;
in response to determining that the review of the first product was favorable, solicit a suggestion from the customer of a second product related to the first product;
in response to determining that the review of the first product was unfavorable, solicit a suggestion from the customer of a third product substitutable for the first product; and
store data identifying the second product or the third product for use in recommending the second product or the third product to another customer.

11. The computer-readable storage medium of claim 10, wherein the second product is an accessory to the first product.

12. The computer-readable storage medium of claim 10, wherein soliciting a suggestion from the customer of a second product related to the first product and soliciting a suggestion from the customer of a third product substitutable for the first product occur contemporaneously with receiving the review of the first product from the customer.

13. The computer-readable storage medium of claim 10, wherein soliciting a suggestion from the customer of a second product related to the first product and soliciting a suggestion from the customer of a third product substitutable for the first product occur after the review of the first product is received from the customer.

14. The computer-readable storage medium of claim 10, having further computer-executable instructions stored thereupon which, when executed by the computer, cause the computer to provide a recommendation to the customer of a product related to the first product in response to determining that the review of the first product was favorable.

15. The computer-readable storage medium of claim 14, wherein the product related to the first product is an accessory product for the first product.

16. The computer-readable storage medium of claim 15, wherein the recommendation is provided contemporaneously with receiving the review of the first product from the customer.

17. The computer-readable storage medium of claim 10, having further computer-executable instructions stored thereupon which, when executed by the computer, cause the computer to provide a recommendation to the customer of a product that is substitutable for the first product in response to determining that the review of the first product was unfavorable.

18. The computer-readable storage medium of claim 17, wherein the recommendation is provided contemporaneously with receiving the review of the first product from the customer.

19. A system for providing a product recommendation, the system comprising:
a merchant system comprising one or more application server computers; and
an online shopping module executing on the one or more application servers configured to
receive a review of a first product from a customer,
determine by a processor whether the review of the first product was favorable or unfavorable,
in response to determining that the review of the first product was favorable, solicit a suggestion from the customer of a second product related to the first product,
in response to determining that the review of the first product was unfavorable, solicit a suggestion from the customer of a third product substitutable for the first product, and
store data identifying the second product or the third product for use in recommending the second product or the third product to another customer.

20. The system of claim 19, wherein the second product is an accessory to the first product.

21. The system of claim 19, wherein soliciting a suggestion from the customer of a second product related to the first product and soliciting a suggestion from the customer of a third product substitutable for the first product occur contemporaneously with receiving the review of the first product from the customer.

22. The system of claim 19, wherein soliciting a suggestion from the customer of a second product related to the first product and soliciting a suggestion from the customer of a third product substitutable for the first product occur after the review of the first product is received from the customer.

23. The system of claim 19, wherein the online shopping module is further configured to provide a recommendation to the customer of a product related to the first product in response to determining that the review of the first product was favorable.

24. The system of claim 23, wherein the product related to the first product is an accessory product for the first product.

25. The system of claim 24, wherein the recommendation is provided contemporaneously with receiving the review of the first product from the customer.

* * * * *